(12) United States Patent
Pellicer

(10) Patent No.: US 7,748,972 B2
(45) Date of Patent: Jul. 6, 2010

(54) TENSIONING INSTALLATION FOR THE FRAMEWORKS OF PRE-TENSIONED ARCHITECTURAL ELEMENTS

(76) Inventor: Carlos Fradera Pellicer, Residencial "El Cortalet", Edificio A, L'Aldosa-la Massana, Andorra (ES)

( * ) Notice: Subject to any disclaimer, the term of this patent is extended or adjusted under 35 U.S.C. 154(b) by 438 days.

(21) Appl. No.: 11/570,856

(22) PCT Filed: Jun. 1, 2005

(86) PCT No.: PCT/ES2005/000313

§ 371 (c)(1),
(2), (4) Date: Dec. 18, 2006

(87) PCT Pub. No.: WO2006/000601

PCT Pub. Date: Jan. 5, 2006

(65) Prior Publication Data

US 2008/0035901 A1 Feb. 14, 2008

(30) Foreign Application Priority Data

Jun. 18, 2004 (ES) .............................. 200401485 U

(51) Int. Cl.
*B28B 23/04* (2006.01)
(52) U.S. Cl. .................. 425/111; 425/116; 425/117; 425/123; 249/82; 249/97; 249/162; 249/177; 52/223.1; 52/223.7; 52/223.8; 52/223.13
(58) Field of Classification Search .............. 425/111, 425/302.1, 330, 355, 406, 410, 411, 426, 425/428, 441, 116, 117, 123, 125, 289, 436 R; 249/26, 33, 50, 52, 64, 82, 83, 85, 95, 97, 249/120, 162, 177; 254/232, 29 A, 93 R; 52/223.13, 222, 223.1, 223.6, 223.7, 223.8, 52/439, 649.3
See application file for complete search history.

(56) References Cited

U.S. PATENT DOCUMENTS

| 2,048,253 A | * | 7/1936 | Freyssinet ..................... 264/71 |
| 2,437,003 A | * | 3/1948 | Ruegg ........................... 425/85 |
| 2,683,915 A | * | 7/1954 | Tournon ..................... 264/570 |
| 2,730,783 A | * | 1/1956 | Kennison ..................... 425/84 |
| 2,763,464 A | * | 9/1956 | Leonhardt ................. 254/29 A |
| 2,794,211 A | * | 6/1957 | Brown et al. ................ 425/111 |
| 2,804,674 A | * | 9/1957 | Long ........................... 264/228 |

(Continued)

FOREIGN PATENT DOCUMENTS

| BE | 500849 A | 2/1952 |
| FR | 1 570 732 A | 6/1969 |
| FR | 2375971 A1 | 7/1978 |
| GB | 657794 | 6/1969 |
| JP | 53-000627 A | 1/1978 |
| JP | 53-001214 A | 1/1978 |
| JP | 53-007721 A | 1/1978 |
| JP | 53-007722 A | 1/1978 |

*Primary Examiner*—Steven P Griffin
*Assistant Examiner*—Seyed Masoud Malekzadeh
(74) *Attorney, Agent, or Firm*—Alston & Bird LLP

(57) ABSTRACT

Tensioning installation for the frameworks of pre-tensioned architectural elements designed for the two-way pre-tensioning of concrete or mortar plates, or the like, comprising a molding assembly made up of a flat molding plate (3) delimited on the perimeter by adjustably positioning side walls (4). The assembly rests on an oversized support platform (1) on which the molding assembly is surrounded by a perimeter area (10) of support platform (1) proper, in which perimeter area (10) hydraulic tensioning devices (7) are provided, which are integral to support platform (1) and are arranged in juxtaposition forming opposite facing pairs according to rectilinear alignments forming a grid. Said hydraulic tensioning devices (7) are all connected together serially forming a hydraulic circuit (8) which, in turn, is connected to a hydraulic pressure connection point (9).

12 Claims, 3 Drawing Sheets

U.S. PATENT DOCUMENTS

| | | | | |
|---|---|---|---|---|
| 2,886,875 | A * | 5/1959 | Anderson | 425/111 |
| 2,995,777 | A * | 8/1961 | Warnken | 425/111 |
| 3,023,475 | A * | 3/1962 | Yerby et al. | 425/111 |
| 3,036,356 | A * | 5/1962 | Greulich | 264/228 |
| 3,084,910 | A | 4/1963 | Allers et al. | |
| 3,128,521 | A * | 4/1964 | Baker | 425/111 |
| 3,152,421 | A * | 10/1964 | Middendorf | 52/223.6 |
| 3,249,374 | A * | 5/1966 | Muche et al. | 403/309 |
| 3,568,274 | A * | 3/1971 | Hidden et al. | 425/111 |
| 3,647,184 | A | 3/1972 | Vanderhurst et al. | |
| 3,647,308 | A * | 3/1972 | Yost | 425/111 |
| 3,938,922 | A * | 2/1976 | Godley | 425/111 |
| 4,023,769 | A * | 5/1977 | Andrews, Jr. | 249/64 |
| 4,029,286 | A * | 6/1977 | Ahl | 249/19 |
| 4,038,355 | A * | 7/1977 | Bratchell | 264/157 |
| 4,040,775 | A * | 8/1977 | Nordbak | 425/111 |
| 4,044,088 | A * | 8/1977 | Hume | 264/130 |
| 4,051,216 | A * | 9/1977 | Bratchell | 264/157 |
| 4,061,454 | A * | 12/1977 | Borcoman | 425/88 |
| 4,105,382 | A * | 8/1978 | Auer et al. | 425/88 |
| 4,115,049 | A * | 9/1978 | Grubb | 425/111 |
| 4,147,322 | A * | 4/1979 | Dahlstrom | 249/40 |
| 4,193,750 | A * | 3/1980 | Nielson | 425/60 |
| 4,207,041 | A * | 6/1980 | Kampiziones | 425/62 |
| 4,242,071 | A * | 12/1980 | Stinton | 425/111 |
| 4,249,873 | A * | 2/1981 | Feuillade | 425/111 |
| 4,253,817 | A * | 3/1981 | Stinton et al. | 425/447 |
| 4,266,921 | A * | 5/1981 | Murray | 425/158 |
| 4,273,740 | A * | 6/1981 | Marchesi et al. | 264/228 |
| 4,409,159 | A * | 10/1983 | Parkins | 264/39 |
| 4,492,552 | A * | 1/1985 | Murakami et al. | 425/218 |
| 4,604,003 | A * | 8/1986 | Francoeur et al. | 405/256 |
| 4,718,838 | A * | 1/1988 | Ren et al. | 425/64 |
| 4,812,113 | A * | 3/1989 | Jantzen | 425/111 |
| 5,316,461 | A * | 5/1994 | Silvestri | 425/111 |
| 5,509,759 | A * | 4/1996 | Keesling | 405/232 |
| 5,524,861 | A * | 6/1996 | Solomon | 249/27 |
| 5,618,476 | A * | 4/1997 | Mogel | 264/40.1 |
| 5,671,572 | A * | 9/1997 | Siller-Franco | 52/223.8 |
| 5,782,043 | A * | 7/1998 | Duncan et al. | 52/167.1 |
| 5,791,933 | A * | 8/1998 | Saka et al. | 439/404 |
| 6,170,209 | B1 * | 1/2001 | Dagher et al. | 52/223.1 |
| 6,561,780 | B2 * | 5/2003 | Ollendick et al. | 425/111 |
| 7,441,380 | B2 * | 10/2008 | Andra et al. | 52/223.13 |
| 2005/0253041 | A1* | 11/2005 | Hensley et al. | 249/33 |
| 2006/0027729 | A1* | 2/2006 | McCracken | 249/189 |

* cited by examiner

TENSIONING INSTALLATION FOR THE FRAMEWORKS OF PRE-TENSIONED ARCHITECTURAL ELEMENTS

FIELD OF THE INVENTION

This invention relates to a tensioning installation for the frameworks of pre-tensioned architectural elements, particularly an installation designed for the two-way pre-tensioning of the frameworks arranged in plates, panels and other flat architectural elements having a large surface area and reduced thickness, made from mortar, concrete and the like in a molding assembly made up of a flat molding plate and adjustably positioning side walls that limit said plate on its perimeter, the assembly being supported on a support platform that is oversized with respect to said side walls.

STATE OF THE ART

Normally, frameworks are pre-tensioned in various ways. One way consists in placing the framework, which is a continuous filiform element, in a zigzag arrangement in both directions through the mold, applying the traction on the two opposite sides of the framework or on just one side; in this case, keeping the framework loops on the side that is not pulled firmly anchored. In another case, rods are used having a length that corresponds to the size of the plate to be reinforced. At one end of said rods, a stopper wedge is attached to the mold side walls, and at the other end a clamping wedge is attached, which is associated with mechanical or hydraulic traction means. At all events, once the mortar or concrete has cured, the framework sections projecting from the manufactured part must be cut away.

Moreover, and as the main drawback, using said wedges requires a long time to prepare the molds and make the grip of said frameworks fairly reliable.

DISCLOSURE OF THE INVENTION

In order to overcome this drawback the solution has been adopted whereby an end stopper is formed on the frameworks, using radial expansion to deform their constituent materials, which can be anchored directly in opposite facing tensioning devices through simple open threading.

According to the adopted solution, the object of the invention has been developed, which consists in a tensioning installation for the frameworks of pre-tensioned architectural elements, designed for the two-way pre-tensioning of concrete or mortar plates, or the like, comprising a molding assembly made up of a flat molding plate and adjustably positioning side walls that limit said molding plate on the perimeter thereof, the assembly resting on a support platform that is oversized with respect to said side walls, characterized in that said molding assembly is surrounded by a perimeter area of the support platform proper, with a plurality of hydraulic tensioning devices being provided in said perimeter area, which are integral with said support platform and are arranged in juxtaposition in opposite pairs according to rectilinear alignments forming a grid, and said hydraulic tensioning devices all being connected together serially forming a hydraulic circuit which, in turn, is connected to a hydraulic pressure connection point.

Preferably, each of said hydraulic tensioning devices is made up of a fixed portion, mounted on said support platform, and a mobile portion that holds one end of the filiform elements making up the framework to be tensioned, said fixed portion having a fixed, cylindrical body and an openable connection cap to said hydraulic circuit, and said mobile portion having a plunger body that is urged by a compression spring and extends into a rod that incorporates an anchoring part in which the ends of said filiform elements making up the framework are anchored, said anchoring part being provided with two sliding rods that slide inside respective guides provided in said fixed, cylindrical body.

Advantageously, said openable cap in each hydraulic tensioning device has a transversal conduit that deviates into an axial conduit which communicates the former with a pressure chamber in the fixed, cylindrical body in which there slides said plunger body of the mobile portion of the hydraulic tensioning device.

Preferably, in each hydraulic tensioning device, said anchoring part for the ends of the filiform elements making up the framework, is mounted in a tilting fashion on the free end of said rod of the plunger body.

Advantageously, in each hydraulic tensioning device, said anchoring part has, as retention means for the ends of the filiform elements making up the framework, deep grooves in which said filiform elements are housed by threading, with said grooves forming a restraint for the heads of stoppers formed at the ends of said filiform elements.

Advantageously, said anchoring part of each tensioning device has respective openings with clearance for housing, in an articulated fashion, said sliding rods that slide in said guides of the fixed, cylindrical body.

Preferably, said openable cap that closes the inside chamber of the fixed, cylinder body has the mouths of said transversal conduit provided with connection means, via said hydraulic circuit, to the openable caps in the adjacent hydraulic tensioning devices.

Preferably, said plunger bodies have perimeter sealing gaskets and a central cavity in registration with said axial conduit.

Advantageously, said fixed, cylinder body has a seat for said compression spring that obliges the plunger body and a friction sleeve for the sliding action of the rod of said plunger body.

Advantageously, said fixed, cylinder body has holes for the passage of the fixing screws of said fixed, cylinder body to the support platform.

Preferably, the support platform has centering arrangements for an auxiliary head for inserting complementary elements and for stripping the architectural element from its mold once the mortar or cement has cured.

Preferably, said mobile portion of the hydraulic tensioning device mounts said anchoring part on said rod in a tilting fashion by providing a screw that passes with clearance through a housing having a holed bottom wall, said screw attaching itself to said rod without pressing said anchoring part, leaving said anchoring part to tilt freely supported on an end projection of said rod of the plunger body.

BRIEF DESCRIPTION OF THE DRAWINGS

To facilitate comprehension of the preceding ideas, a description of a preferred embodiment of the invention is provided below, with reference to the attached illustrative drawings, in which.

DETAILED DESCRIPTION OF AN EMBODIMENT OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
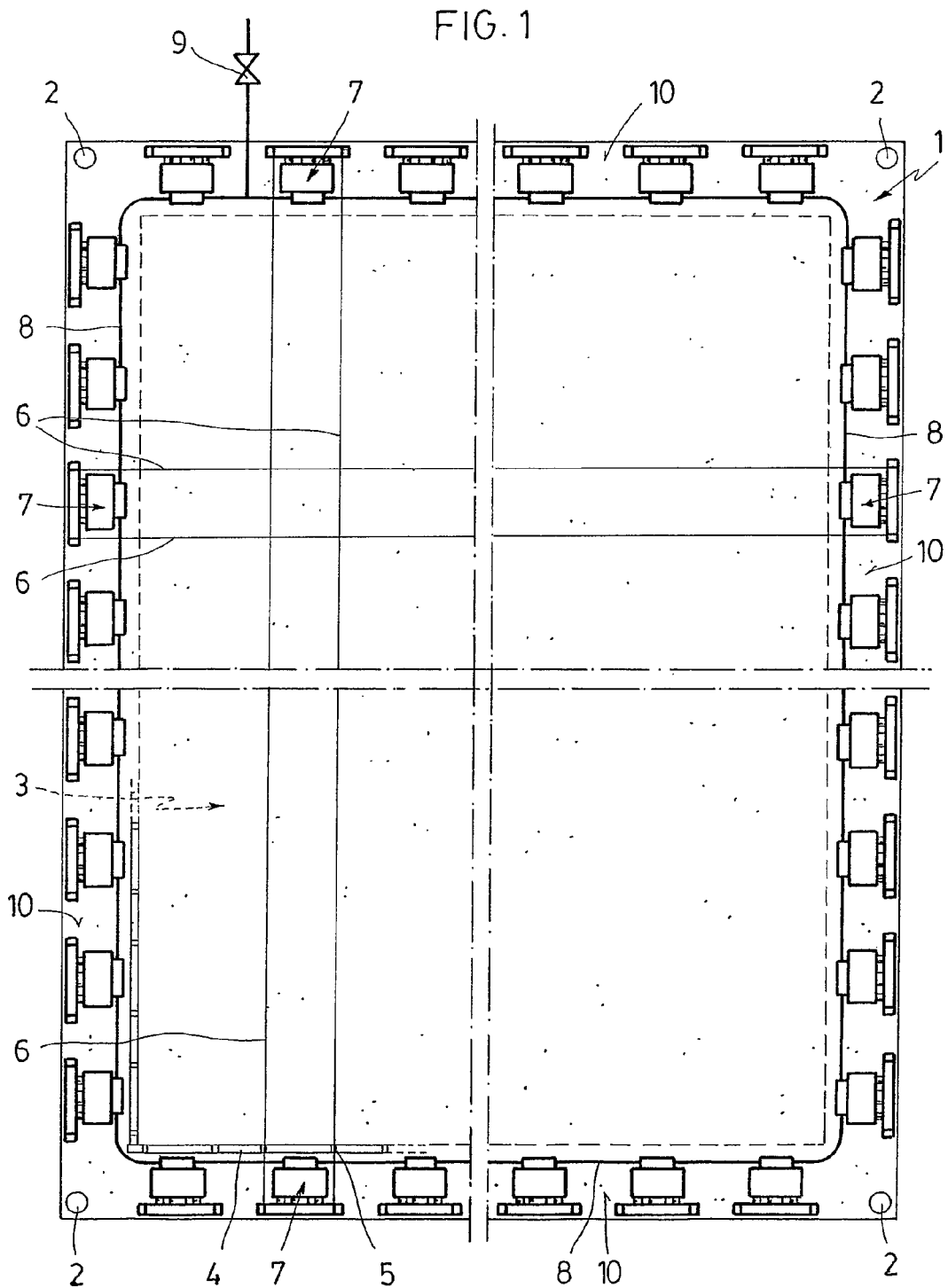
FIG. 1, represents in a top plane view, a preferable embodiment of a tensioning installation implemented according to the invention.

FIG. 1 represents diagrammatically, an arrangement for molding lightweight mortar or cement plates, which includes an installation for the two-way pre-tensioning of the framework of said plates, which is carried out according to the invention.

Said figure represents a rectangular shaped support platform 1 which, at least at its corners, has centering arrangements 2, such as holes, rods, etc.

On the support platform 1 a molding plate 3 extends, preferably made from polyurethane, bearing relieves of the texture to be given to the lightweight mortar plate, said molding plate 3 being surrounded by molding walls or side walls 4 with transversal slits 5 for the passage of the filiform elements 6 making up the framework and which, in pairs, are anchored at their ends to the hydraulic tensioning devices 7 which, in turn, flank said side walls 4 and are connected together serially by a conduit or circuit 8 that transports a hydraulic fluid which is introduced under pressure through the valve 9.

Figure 2:
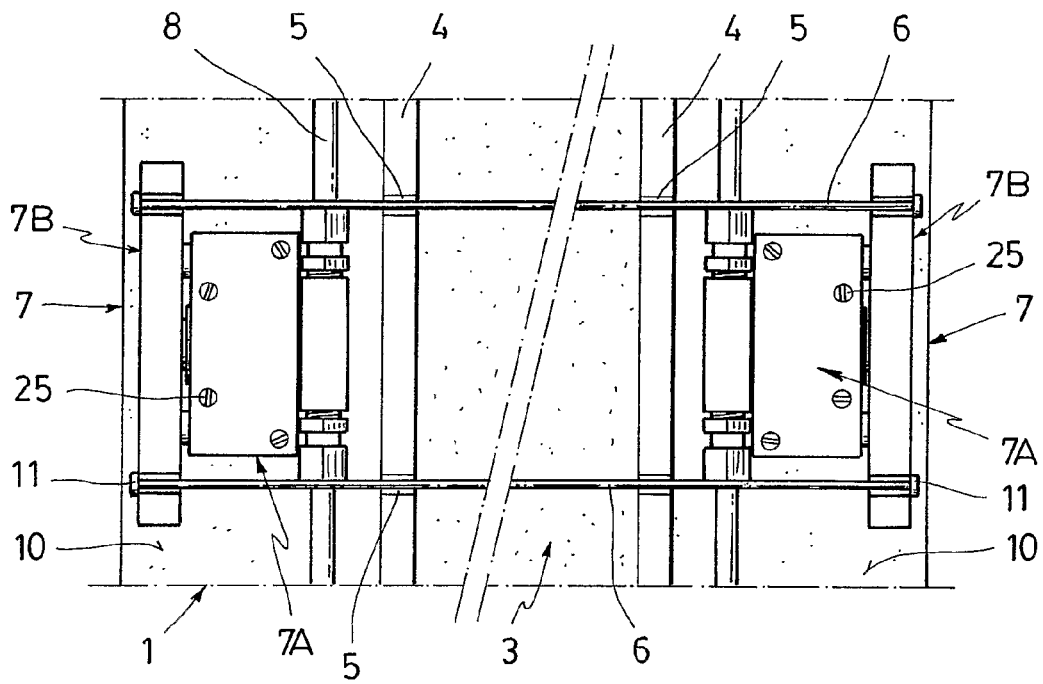
FIG. 2, represents, diagrammatically in a plan view, two hydraulic tensioning devices according to the invention, which arranged opposite to one another on the support platform, incorporate the filiform elements of a framework to be tensioned.
Figure 3:
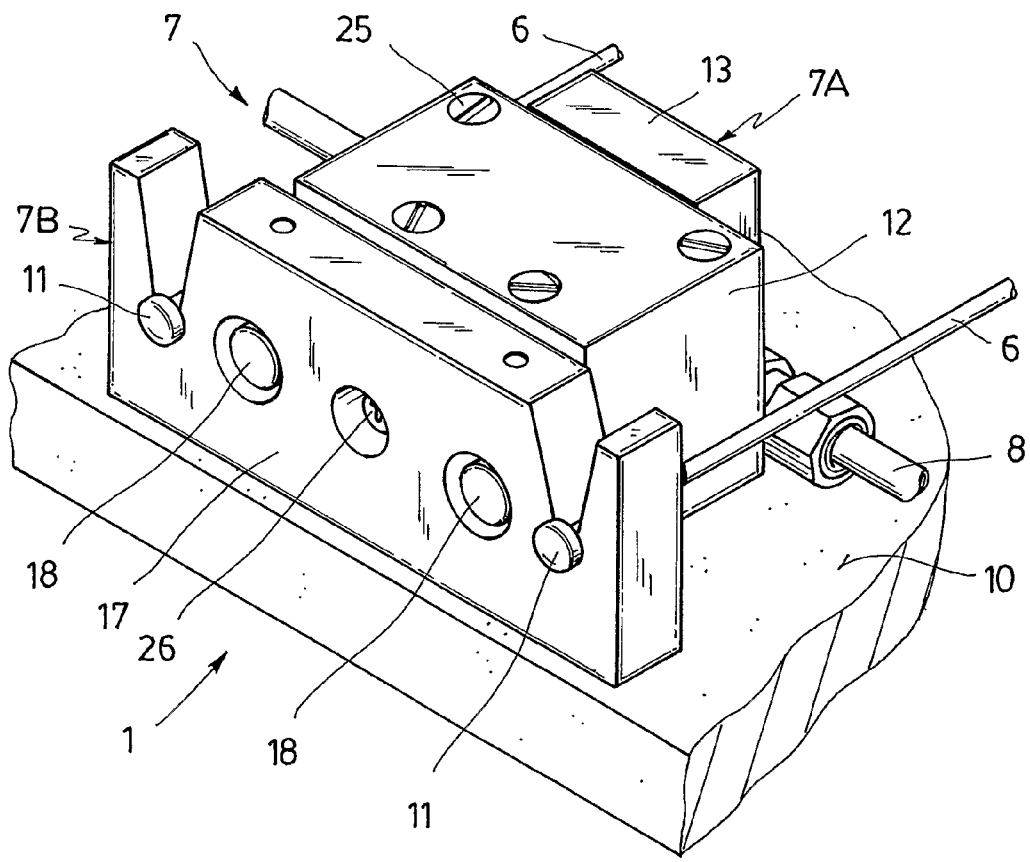
FIG. 3, represents, in perspective, one of the hydraulic tensioning devices in the preceding figures.
Figure 4:
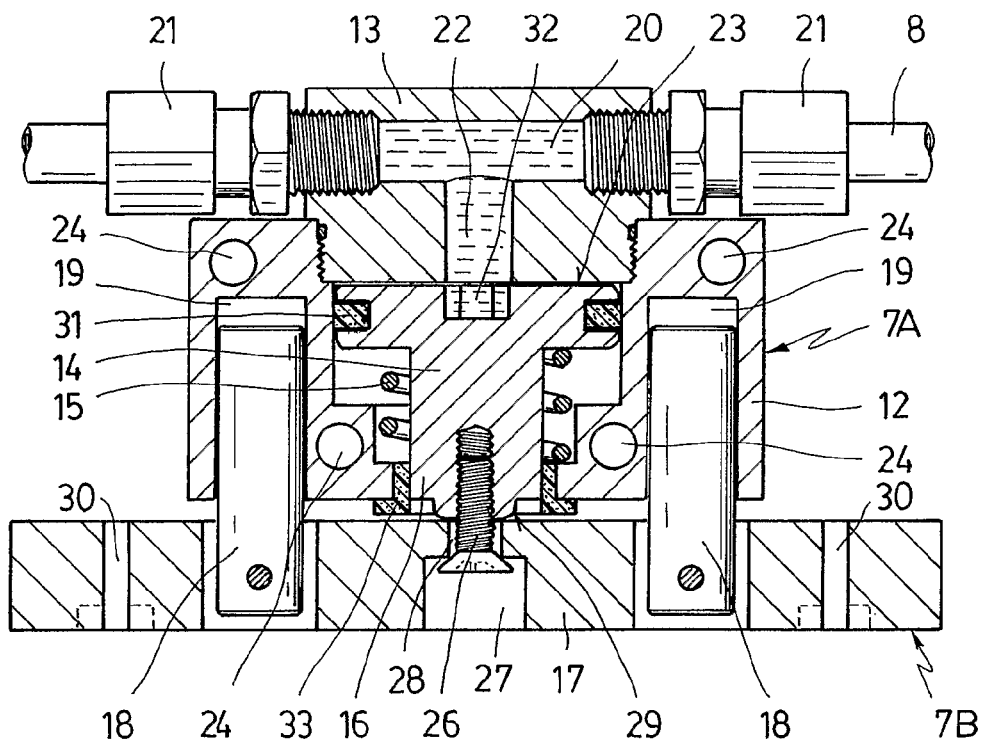
FIG. 4, represents a horizontal section view of one of the tensioning devices in its resting position.
Figure 5:
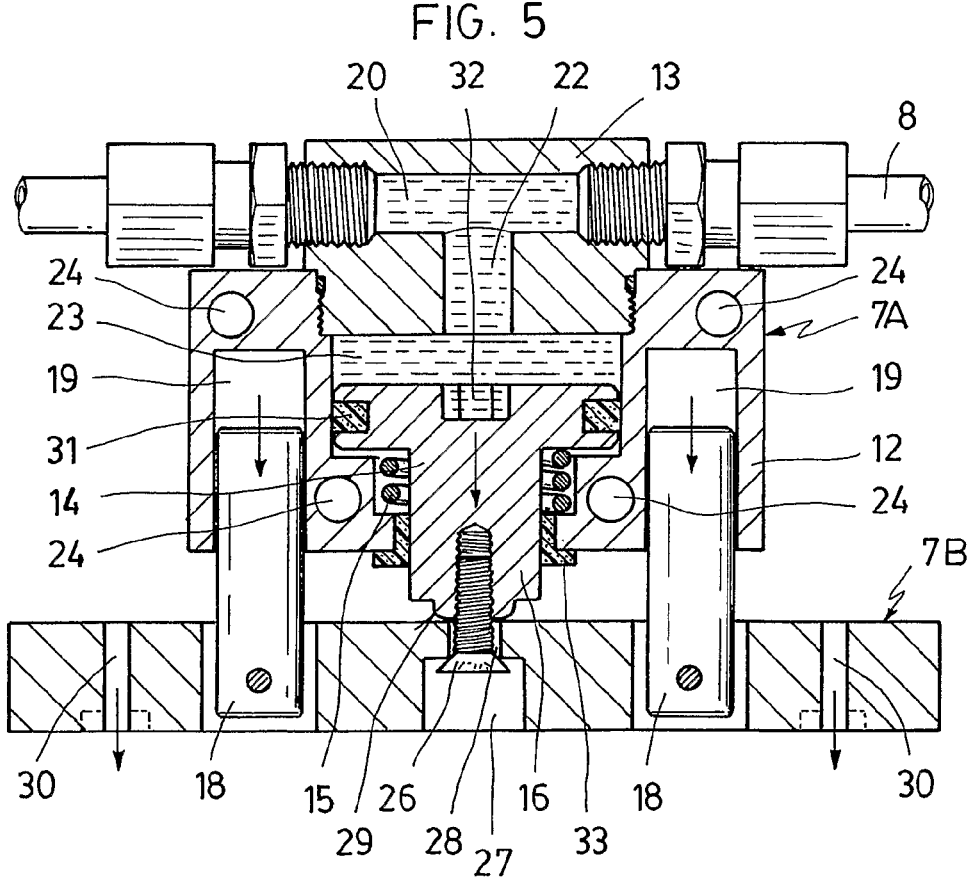
FIG. 5, represents, similar to the preceding figure, showing the tensioning device is in its working position.

Said hydraulic tensioning devices 7 are mounted fixedly in a marginal perimeter area 10 of support platform 1 and they are arranged equidistantly and in juxtaposition forming opposite facing pairs according to rectilinear alignments forming a grid, as can be seen in FIG. 1 and detailed in FIG. 2.

Hydraulic tensioning devices 7 are divided into a fixed portion 7A, which is mounted on perimeter area 10 of support platform 1, and a mobile portion 7B in which there are anchored the heads of end stoppers 11 of filiform elements 6 of the pre-tensioned framework.

Said fixed portion 7A is made up of a fixed, cylindrical body 12 and a connection cap 13 to conduits 8 of the hydraulic circuit, while mobile portion 7B is divided into a plunger body 14, urged by a compression spring 15, which extends into a rod 16 that incorporates an anchoring part 17 having two articulated sliding rods 18 that slide inside guides 19 arranged in said fixed, cylindrical body 12.

Connection cap 13, which can be opened through threading, has a transversal conduit 20 to which conduits 8 of the hydraulic circuit are connected via connectors 21, which conduit diverges into an axial conduit 22 transversal thereto and which communicates the former with inner chamber 23 in fixed, cylindrical body 12 through which there slides plunger body 14 of mobile portion 7B of hydraulic tensioning device 7.

Also, fixed, cylindrical body 12 has holes 24 for the passage of fixing screws 25 thereof to support platform 1

For its part, said mobile portion 7B mounts anchoring part 17 on rod 16 in a tilting fashion, via the arrangement of a screw 26 that passes with clearance through a housing 27 having a holed bottom wall 28, and which is attached to said rod 16 without pressing on anchoring part 17, which is left to tilt freely on its support on an end projection 29 of said rod 16 of plunger body 14.

Said anchoring part 17 has, as retention means for the heads of end stoppers heads 11 of filiform elements 6, deep grooves 30 into which there is introduced, by open threading, the filiform portion of the ends of filiform elements 6 making up the framework.

Plunger body 14 of fixed portion 7A has sealing gaskets 31 and a central hollow 32 in registration with axial conduit 22 arranged axially in connection cap 13. Also, rod 16 of said plunger body 14 slides inside a friction sleeve 33 inserted into fixed, cylindrical body 12.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Tensioning installation for frameworks of pre-tensioned architectural elements, the tensioning installation being adapted for two-way pre-tensioning of concrete or mortar plates, comprising a molding assembly having a flat molding plate and adjustably positioned side walls extending about and limiting a perimeter of said flat molding plate, the molding assembly being supported by a support platform having a perimeter area surrounding the molding assembly, and wherein a plurality of hydraulic tensioning devices is provided in said perimeter area in engagement with said support platform, the hydraulic tensioning devices being arranged in juxtaposition in opposite facing pairs thereof across the molding plate, each of the opposite facing pairs having a filiform element extending therebetween, with the filiform elements being arranged in rectilinear alignment so as to form a grid, each hydraulic tensioning device having a fixed portion mounted on said support platform and a mobile portion engaged with one end of the corresponding filiform element, the hydraulic tensioning devices being serially connected together to form a hydraulic circuit, with the hydraulic circuit being connected to a hydraulic pressure source at a connection point, the mobile portions of the hydraulic tensioning devices being configured to be responsive to application of hydraulic pressure to the hydraulic circuit to extend from the respective fixed portions and away from the molding plate to exert a tension on the filiform elements extending between each of the opposite facing pairs.

2. Tensioning installation according to claim 1, wherein the framework to be tensioned comprises a plurality of the filiform elements, said fixed portion having a fixed cylindrical body and an openable connection cap to said hydraulic circuit, and said mobile portion having a plunger body urged by a compression spring and extending into a rod having an anchoring part, the ends of said filiform elements making up the framework being anchored in the anchoring part, said anchoring part having two sliding rods configured to slide inside respective guides provided in said fixed cylindrical body.

3. Tensioning installation according to claim 2, wherein said openable connection cap of each hydraulic tensioning device has a transverse conduit configured to diverge into an axial conduit in communication with a pressure chamber of the fixed cylindrical body having the plunger body of the mobile portion of the hydraulic tensioning device sliding therein.

4. Tensioning installation according to claim 2, wherein, in each hydraulic tensioning device, said anchoring part for anchoring the ends of filiform elements making up the framework is pivotably mounted on a free end of said rod of the plunger body.

5. Tensioning installation according to claim 2, wherein, in each hydraulic tensioning device, said anchoring part defines grooves forming a retainer for heads of stoppers formed at the ends of said filiform elements.

6. Tensioning installation according to claim 2, wherein said anchoring part of each hydraulic tensioning device defines respective holes with clearance for articulately housing said sliding rods sliding along said guides of the fixed cylindrical body.

7. Tensioning installation according to claim 3, wherein said openable connection cap in communication with the pressure chamber of each fixed cylindrical body has opposing mouths of said transverse conduit, each mouth being provided with a connection mechanism, with respect to the hydraulic circuit, for connecting to the openable connection caps of adjacent hydraulic tensioning devices.

8. Tensioning installation according to claim 2, wherein said plunger body has a perimeter sealing gasket and defines a central hollow in registration with said axial conduit.

9. Tensioning installation according to claim 2, wherein said fixed, cylindrical body has a seat for said compression spring, wherein said compression spring urges the plunger body and a friction sleeve for the sliding of the rod of said plunger body.

10. Tensioning installation according to claim 2, wherein said fixed cylindrical body defines holes for passage of fixing screws for fixing said cylindrical body to the support platform.

11. Tensioning installation according to claim 2, wherein the support platform has centering arrangements for an auxiliary head for inserting complementary elements and for removal of the architectural element, once cured, from the molding assembly.

12. Tensioning installation according to claim 2, wherein said mobile portion of the hydraulic tensioning device pivotably mounts said anchoring part on said rod via a screw passing with clearance through a hole defined by the anchoring part, said screw being attached to said rod without pressing said anchoring part, thereby leaving said anchoring part to pivot about an end projection of said rod of the plunger body.

* * * * *

UNITED STATES PATENT AND TRADEMARK OFFICE
CERTIFICATE OF CORRECTION

PATENT NO. : 7,748,972 B2  Page 1 of 1
APPLICATION NO. : 11/570856
DATED : July 6, 2010
INVENTOR(S) : Pellicer It is certified that error appears in the above-identified patent and that said Letters Patent is hereby corrected as shown below:

Column 6,

Line 13, "cylindrical body" should read --fixed cylindrical body--.

Signed and Sealed this
Thirtieth Day of August, 2011

David J. Kappos
*Director of the United States Patent and Trademark Office*